United States Patent [19]

Swarup et al.

[11] Patent Number: 6,087,444
[45] Date of Patent: *Jul. 11, 2000

[54] HUMIDITY RESISTANT AQUEOUS URETHANE RESINS BASED ON HYDROPHOBIC POLYHYDROXY COMPOUNDS AND COATINGS

[75] Inventors: Shanti Swarup, Hampton Township, Allegheny County; Anbazhagan Natesh, Horsham Township, Montgomery County; Gina M. Terrago, McCandless Township, Allegheny County; Cathy A. Taylor, Shaler Township, Allegheny County, all of Pa.

[73] Assignee: PPG Industries Ohio, Inc., Cleveland, Ohio

[*] Notice: This patent is subject to a terminal disclaimer.

[21] Appl. No.: 08/718,284

[22] Filed: Sep. 20, 1996

[51] Int. Cl.$^7$ ............. C09D 175/04; C09D 175/06; C08L 75/04; C08G 18/42
[52] U.S. Cl. ............. 525/123; 523/404; 523/406; 523/415; 523/428; 523/500; 523/501; 524/500; 524/507; 524/591; 524/840; 525/111; 525/131; 525/403; 525/404; 525/407; 525/440; 525/453; 525/454; 525/455; 528/71; 528/80; 528/81; 528/73
[58] Field of Search ............. 523/404, 406, 523/415, 428, 500, 501; 524/500, 507, 591, 840; 525/111, 123, 131, 403, 404, 407, 440, 453, 455, 454; 528/71, 80, 81, 73

[56] References Cited

U.S. PATENT DOCUMENTS

| | | | |
|---|---|---|---|
| 3,607,800 | 9/1971 | Sekmakas | 525/528 |
| 3,684,758 | 8/1972 | Honig et al. | 524/507 |
| 3,705,164 | 12/1972 | Honig et al. | 524/591 |
| 3,870,684 | 3/1975 | Witt et al. | 524/591 |
| 4,198,330 | 4/1980 | Kaizerman et al. | 523/501 |
| 4,203,883 | 5/1980 | Hangauer, Jr. | 524/591 |
| 4,318,833 | 3/1982 | Guagliardo | 524/457 |
| 4,408,008 | 10/1983 | Markusch | 524/591 |
| 4,533,534 | 8/1985 | Kordomenos et al. | 523/436 |
| 4,632,860 | 12/1986 | D'Antonio et al. | 428/290 |
| 4,644,030 | 2/1987 | Loewrigkeit et al. | 524/457 |
| 4,647,612 | 3/1987 | Ranka et al. | 524/458 |
| 4,732,929 | 3/1988 | Chang et al. | 524/541 |
| 4,791,168 | 12/1988 | Salatin et al. | 524/601 |
| 4,822,685 | 4/1989 | Perez et al. | 428/423.3 |
| 5,071,904 | 12/1991 | Martin et al. | 524/458 |
| 5,118,752 | 6/1992 | Chang et al. | 524/521 |
| 5,137,961 | 8/1992 | Goos et al. | 524/457 |
| 5,173,526 | 12/1992 | Vijayendran et al. | 524/457 |
| 5,397,646 | 3/1995 | Nickle et al. | 428/423.1 |
| 5,728,769 | 3/1998 | Natesh et al. | 524/591 |
| 5,739,194 | 4/1998 | Natesh et al. | 524/457 |
| 5,854,332 | 12/1998 | Swarup et al. | 524/507 |

FOREIGN PATENT DOCUMENTS

| | | |
|---|---|---|
| 2124262 | 11/1994 | Canada . |
| 2148550 | 11/1995 | Canada . |
| 308 115 | 3/1989 | European Pat. Off. . |
| 0626401 | 11/1994 | European Pat. Off. . |
| 0682049 | 11/1995 | European Pat. Off. . |

*Primary Examiner*—Rabon Sergent
*Attorney, Agent, or Firm*—Dennis G. Millman

[57] ABSTRACT

A water reducible polyurethane resin for use in coating compositions is provided with humidity resistance at relatively low cost by employing a urethane prepolymer which is the reaction product of (i) a polyisocyanate, (ii) a polyhydroxy compound which is the reaction product of an organic acid and an epoxy compound, at least one of which includes a hydrocarbon group of at least six carbon atoms, and (iii) a monomer having an anionic group and functionality reactive with isocyanate. Preferred embodiments employ $C_{36}$ dimer diacid and the propylene oxide ester of neodecanoic acid to make the polyhydroxy compound.

20 Claims, No Drawings

HUMIDITY RESISTANT AQUEOUS URETHANE RESINS BASED ON HYDROPHOBIC POLYHYDROXY COMPOUNDS AND COATINGS

BACKGROUND OF THE INVENTION

The present invention relates to aqueous polymer dispersions comprising polyurethanes useful in coating compositions.

In producing water-based polyurethane resins for use in coating compositions, it is desirable to achieve a combination of properties including low temperature curing, gloss, flexibility, durability, abrasion resistance, and solvent resistance. A particular problem encountered with at least some water-based polyurethane coating compositions has been a susceptibility to loss of adhesion when the cured coating is exposed to humid conditions. The following prior art attempts at producing water-based polyurethanes do not address the humidity resistance problem.

U.S. Pat. No. 3,705,164 (Honig et al.) discloses a process for making stable aqueous polymer dispersions by subjecting vinyl monomers (e.g., acrylics) to emulsion polymerization in the presence of a stable aqueous dispersion of a polyurethane containing anionic groups. Coatings are disclosed as a use of the resulting polymer dispersions.

U.S. Pat. No. 4,198,330 (Kaizerman et al.) discloses modifying an aqueous polyurethane by means of vinyl monomers by a process similar to that of the U.S. Pat. No. 3,705,164 patent.

U.S. Pat. No. 4,644,030 (Loewrigkeit et al.) discloses a method for making an aqueous dispersion of polyurethane by first producing an isocyanate-terminated polyurethane prepolymer in ethylenically unsaturated monomers such as acrylates. The polyurethane prepolymer is then dispersed in water and is chain-extended. Thereafter the unsaturated monomer material is polymerized in situ in the aqueous dispersion.

EP-A-0 308 115 discloses an aqueous polymer dispersion containing an anionic water-dispersible polyurethane and a vinyl polymer obtained by a process similar to that of the U.S. Pat. No. 4,644,030 patent.

U.S. Pat. No. 4,318,833 (Guagliardo) discloses a waterborne polyurethane/acrylate in which the acrylate portion is dominant.

U.S. Pat. No. 4,791,168 (Salatin et al.) relates to incorporating polyester polyols made from long-chain carboxylic acids into waterborne polyurethane resins. The polyesters may be made by reacting alcohols with $C_{36}$ dimer acid sold under the name EMPOL 1010. The patent discloses that the long chain acids add hydrophobicity to the polyester to achieve the objective of increasing the speed with which waterborne polyurethane coating compositions can be dried.

U.S. Pat. No. 5,118,752 (Chang et al.) discloses aqueous polymerization of vinyl monomers, including acrylates, in the presence of a polymeric surfactant containing urethane groups and silane groups. Among the isocyanates used to make the urethane portion of the surfactant is included a hydrophobic isocyanate ("DDI" diisocyanate). A comparative example without silane groups is also disclosed, but is reported in the patent to perform poorly. All of the examples disclosed in the patent employ a substantially larger amount of vinyl polymer relative to the polyurethane polymer, and the vinyl portion is predominately styrene.

U.S. Pat. No. 5,173,526 (Vijayendran et al.) involves a method for making aqueous polyurethane/acrylates similar to Chang et al., except that no silane groups are included, no hydrophobic isocyanates are used, and the use of an oil-soluble initiator is required. The resulting aqueous polymer dispersion is intended for use in paper coatings.

Commonly owned, copending U.S. patent application Ser. Nos. 08/668,069 and 08/668,901 relate to polyurethane and polyurethane/acrylic polymers having improved humidity resistance provided by the inclusion of a polyurethane synthesized from a polyisocyanate having at least one open carbon chain greater than six carbon atoms in length between two isocyanate groups, preferably at least eight carbon atoms in length. Although this polyisocyanate preferably constitutes a minor portion of the polyisocyanate mixture used to make the polyurethane, commercially available polyisocyanates of this type are relatively costly. It would be desirable to improve humidity resistance properties without incurring the high cost of the prior applications.

SUMMARY OF THE INVENTION

It has now been found that aqueous dispersions of polyurethane/acrylic polymers can be made that provide water-based coating compositions with good humidity resistance as well as a combination of performance properties required for commercial coating uses, without requiring the use of costly special types of polyisocyanates. Instead, more conventional, less costly polyisocyanates are employed to make the polyurethanes of the present invention. The novelty of the present invention lies in the polyhydroxy compounds that are reacted with the polyisocyanates to form polyurethane prepolymers. More specifically the polyhydroxy compounds of the present invention are the reaction product of a polyacid having a relatively long hydrocarbon segment and an epoxy compound. The polyacid, preferably a diacid, that is used to make the polyhydroxy compound is characterized by the presence of at least one carbon chain greater than six carbon atoms in length. Preferably, the epoxy compound also includes a relatively large hydrocarbon group. The resulting polyhydroxy compound advantageously has a more narrowly defined product range compared to polyester polyols made from acids and alcohols.

In making the polyurethane prepolymer, along with the polyisocyanate and the polyhydroxy compound, there is included an isocyanate-reactive compound containing a salt-forming group in a sufficient amount to render the polyurethane dispersible in water. The polyurethane prepolymer is neutralized, dispersed in water, and chain-extended to form an aqueous polyurethane that may be included in an aqueous coating composition. Alternatively, a urethane/acrylic polymer may be made by adding acrylic monomers to the polyurethane prepolymer, and after the dispersion and chain extension steps, polymerizing the acrylic monomers in situ.

Alternatively, the long chain diacid may be introduced into the vinyl polymer portion of the resin by copolymerizing with the vinyl (acrylate or methacrylate) monomers the reaction product of a long chain diacid, an epoxy compound, and an epoxy acrylate. In preferred embodiments, the long chain diacid component is present in both the polyurethane and the acrylic portions of the resin.

The aqueous polyurethane dispersions can be formulated into coating compositions that can be applied to metal substrates, as well as to temperature sensitive substrates such as plastics and wood because curing of the coating can take place at ambient temperatures. The compositions need not contain thermally activated crosslinking agents, and advantageously dry relatively rapidly at ambient temperatures. Optionally, thermally activated crosslinking agents may be included. The coatings have found utility in the original manufacture of automobiles, low temperature refinish coating of automobiles, and low temperature coating of plastic articles.

DETAILED DESCRIPTION OF THE INVENTION

The aqueous polyurethane dispersion of the present invention may be prepared by forming an isocyanate-terminated polyurethane prepolymer including salt-forming groups sufficient to permit dispersion of the prepolymer in water, adding a neutralizing agent to the prepolymer to salify the ion-forming groups, dispersing the prepolymer in water, adding a chain extender to the aqueous dispersion, and completing the chain extension of the polyurethane prepolymer.

The urethane prepolymers may be produced by reacting a stoichiometric excess of a polyisocyanate with the specialized polyhydroxy compounds of the present invention. Additionally, the reactants for forming the prepolymer include an additional monomer reactive with isocyanate and having a salt-forming group for providing water dispersibility to the prepolymer. Other polyols reactive with isocyanate may also be included.

To attain the results of the present invention, it is important that the polyhydroxy compounds used to form the urethane prepolymer contain a hydrocarbon group greater than $C_6$ in length, preferably at least $C_8$ in length. This polyhydroxy compound may additionally include aliphatic, cycloaliphatic, araliphatic or aromatic segments. It is believed that the presence of relatively large hydrocarbon groups in the polyhydroxy compound contributes to the improved humidity resistance exhibited by the coatings of the present invention. The presence of a plurality of hydrocarbon groups at least $C_6$ in length appears to be helpful, and the presence of cycloaliphatic groups also appears to have a positive effect. The polyhydroxy compounds are the reaction product of an acid and an epoxy compound, at least one of which is polyfunctional. Preferably a diacid is reacted with a monoepoxy compound to yield a compound having two hydroxyl groups which may then be reacted with polyisocyanates to produce urethane prepolymers. The desired hydrocarbon groups may be contributed to the polyhydroxy compound by either the polyacid or the epoxy reactants, or both.

Polyacids that are used to make the polyhydroxy compounds that have the desired long chain hydrocarbon groups are characterized as having hydrocarbon chains at least $C_6$ in length, preferably at least $C_8$ in length. Examples include adipic acid and dodecanedioic acid. A plurality of hydrocarbon chains is also considered advantageous, and a particular type of polyacid of this type that has been found suitable is characterized by the structure:

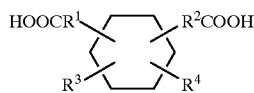

where $R^1$, $R^2$, $R^3$, and $R^4$ may be the same or different, $R^1$ and $R^2$ each contain alkylene groups at least $C_6$ in length (preferably at least $C_8$), and $R^3$ and $R^4$ each are H or an alkyl group. Preferably both of $R^3$ and $R^4$ are alkyl groups. In general, longer alkyl or alkylene groups provide greater hydrophobicity, which is desirable. Although no upper limit has been identified, alkylene groups longer than $C_{20}$ are uncommon. A commercial source of such acids are the so-called "dimer acids" and "trimer acids" sold under the name EMPOL® by the Henkel Corporation, Emery Group, Cincinnati, Ohio. These are produced by the polymerization of fatty acids, and the various EMPOL® products differ from each other in the relative proportions of dimer and trimer acids present, as well as monoacid impurity and amount of residual unsaturation remaining. The dimer acids are $C_{36}$ and the trimer acids are $C_{54}$. A particular example is EMPOL 1008, which is believed to contain a substantial fraction of 2-heptyl-3,4-bis(9-carboxyl nonyl)-1-pentyl-cyclohexane.

If polyepoxy reactants are used, monoacids may be used as the other reactant to make the polyhydroxy compounds of the present invention. Preferably, the larger organic monoacids are used for this purpose such as caproic, caprylic, capric, lauric myristic, palmitic, stearic, oleic, linoleic or linolenic acids.

Epoxy compounds for reacting with the polyacid to form the polyhydroxy compound may be selected from a broad range of known epoxy compounds. Since undue polymerization is preferably avoided when synthesizing the polyhydroxy compounds, the epoxy reactants are predominantly monoepoxies when polyacids comprise the other reactant. The smaller alkylene oxides, although not precluded, are not preferred so as to avoid handling gaseous reactants. Although it is not believed to be required, particularly when reacted with one of the acids having relatively high hydrocarbon content discussed above, using an epoxy that contributes additional hydrocarbon content is preferred. A particular monoepoxy product that is preferred because it is readily available and is relatively inexpensive is CARDURA E, the glycidyl ester of neodecanoic acid and propylene oxide commercially available from Shell Chemical Co. This example is particularly useful in that it contributes a terminal $C_9$ group to the polyhydroxy compound. Other commercially available monoepoxides having substantial hydrocarbon content are the epoxidized alpha olefins of the formula:

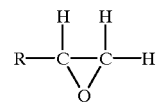

where R is hydrogen or an alkyl group having 1 to 26 carbon atoms. Preferably R is at least $C_6$. The polyhydroxy compounds are made by reacting an excess of the monoepoxy compound with the polyacid to yield a hydroxy functional ester compound. Polyepoxies such as the commercially available family of EPON products may be used, particularly if reacted with monoacids. Alternatively, polyepoxy compounds can be reacted with an excess of polyacid to limit molecular weight increase.

Alternatively, the long chain hydrocarbon group may be introduced into the vinyl polymer portion of the resin rather than the urethane portion. This may be accomplished by copolymerizing with the vinyl (acrylic) monomers the reaction product of an acid, an epoxy compound, and an epoxy acrylate, at least one of which includes the minimum hydrocarbon chain content discussed above. In preferred embodiments, a component with long chain hydrocarbon content is present in both the urethane and the acrylic portions of the resin. For this embodiment, the acids and epoxy compounds may be the same reactants discussed above. An example of an epoxy acrylate is glycidyl methacrylate.

Polyisocyanates that may be used in making the urethane prepolymer may be selected from a wide range of polyisocyanate compounds considered suitable for coating applications. These include aliphatic, cycloaliphatic, arylaliphatic or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. The isocyanate may also include mixtures of polyisocyanates.

Although polyhydroxy compounds synthesized from polyacids and epoxy compounds as described above may theoretically be used as the major reactant for reacting with the polyisocyanate, practical considerations such as cost generally limit them to no more than 50 percent by weight of the isocyanate-reactive monomer content. Providing a second polyol also permits additional attributes to be imparted to the product. In the particular embodiments tested, the advantages of the present invention would not be expected to be significantly perceptible when the specialize polyhydroxy compounds are present in the monomer mixture in amounts less than about 20 percent by weight of the total polyol reactants. Significant improvements may be obtained when the polyhydroxy compound constitutes at least 25 percent of the polyol mixture, and optimum results may be obtained at levels of at least 30 percent. The remainder of the polyol mixture may constitute a second polyol of a more conventional type as described below.

The optional polyols reacted with the polyisocyanates to form the urethane prepolymer may be members of any of the chemical classes of polyols used or proposed to be used in polyurethane formulations. Low molecular weight diols could possibly be used, but it is preferred to use polymeric polyols for at least a portion of the polyol component for the sake of flexibility in the coating. Polymeric polyols having molecular weights in the range of 200–6000 are typical. In particular, the polyols may be polyesters, polyesteramides, polyethers, polythioethers, polycarbonates, polyacetals, polyolefins or polysiloxanes. Polyester polyols are particularly preferred and include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

To provide for water dispersibility, the monomer mixture used to produce the urethane prepolymer may include isocyanate-reactive compounds containing salt forming groups. Most conveniently, the polymer is made anionic, whereby the salt-forming group may be a carboxylic acid group which can subsequently be neutralized to salt form. In that case, the monomer can be a polyol having a carboxylic acid group. These include carboxy group containing diols and triols, for example dihydroxyalkanoic acids of the formula:

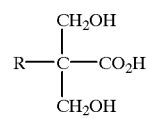

wherein R is hydrogen or a $C_1-C_{10}$ alkyl group. Specific examples of isocyanate-reactive acids include 2,2-di(hydroxymethyl)acetic acid, 2,2,2-tri(hydroxymethyl)acetic acid, 2,2-di(hydroxymethyl)butyric acid, 2,2-di(hydroxymethyl)pentanoic acid, and the like. The preferred carboxy-containing diol is 2,2-di(hydroxymethyl)propionic acid. If desired, the carboxy-containing diol or triol may be incorporated into a polyester by reaction with a dicarboxylic acid before being incorporated into the prepolymer. The concentration of salt-forming groups is chosen so as to provide stability to the aqueous dispersion of the prepolymer in water. This will vary in accordance with the hydrophobicity of the particular polymer. For the best results, the acid number for the final polyurethane/acrylic dispersion may be in the range of 1 to 125 milligrams KOH per gram of polymer solids, preferably 20 to 100.

The anionic, water-dispersible, isocyanate-terminated urethane prepolymer may be prepared in the conventional manner by reacting a stoichiometric excess of the polyisocyanates with the polyols under substantially anhydrous conditions at a temperature between about 30° C. and 1 30° C. until the reaction between the isocyanate groups and the hydroxyl groups is substantially complete. The polyisocyanate and the polyol components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation. The water reducible polyurethane resin can have the polyurethane as the reaction product of:

(i) 20–70 percent by weight of said polyisocyanate;
(ii) 25–70 percent by weight of said polyhydroxy compound; and
(iii) 1–10 percent by weight of said monomer having an anionic group and functionality reactive with isocyanate; the weight percentages based on total resin solids weight of the polyurethane reactants. Particularly the reaction product is of:
(i) 30–60 percent by weight of said polyisocyanate;
(ii) 25–60 percent by weight of said polyhydroxy compound; and
(iii) 5–10 percent by weight of said monomer having an anionic group and functionality reactive with isocyanate; the weight percentages based on total resin solids weight of the polyurethane reactants.

Before the prepolymer is dispersed in water, ammonia or a water soluble or dispersible amine is added to the mixture in an amount sufficient to substantially neutralize the carboxylic functionality as is well known in the art. The amine is added at about 65 to 120% amine equivalent per equivalent of carboxy functionality, preferably about 80% to 100%. Amines that may be used for neutralization are relatively volatile so that they may evaporate from the coating upon curing. Ammonia, or primary, secondary, or tertiary aliphatic, alicyclic, aromatic, araliphatic or heterocyclic amines may be used. Amines with hydroxy substituted alkyl groups may also be suitable. Examples of amines include diethylamine, diethanolamine, diisopropanolamine, 2-methyl-2-aminopropanol, triethylamine, dimethylethanolamine, methyldiethanolamine, and methyldiethylamine. The prepolymer/vinyl monomer mixture may be dispersed in water using techniques well known in the art. Preferably, the mixture is added to the water with agitation, or, alternatively, water may be stirred into the mixture.

The urethane prepolymer is preferably chain extended by addition of an active hydrogen-containing compound to the aqueous system. The chain extender may be a polyol, an amino alcohol, ammonia, or a primary or a secondary aliphatic, alicyclic, aromatic, araliphatic or heterocyclic amine, especially a diamine. Examples of suitable chain extenders include hydrazine, ethylenediamine, diethylene triamine, triethylene tetramine, propylene diamine, butylene diamine, pentane diamine, hexamethylene diamine, cyclohexylene diamine, piperazine, 2-methyl piperazine, phenylene diamine, toluene diamine, tris(2-aminoethyl)amine, 4,4'-methylenebis(2-chloraniline), 3,3'-dichloro-4,4'-diphenyl diamine, 2,6-diaminopyridine, 4,4'-diaminodiphenyl methane, isopherone diamine, and adducts of diethylenetriamine with acrylate or its hydrolyzed products. Also suitable are amines as above having substitutions in the alkyl groups.

The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

The chain extending reaction begins to proceed upon addition of the chain extender to the aqueous dispersion.

In addition to the reaction product of the polyisocyanate, polyhydroxy compound and monomer with an anionic group the water reducible polyurethane resin can have a free radical polymerization product of a mixture of vinyl monomers. Such a water reducible polyurethane resin includes 50–90 percent by weight of the polyurethane and 10–50 percent by weight of the free radical polymerization product of a mixture of vinyl monomers, where the weight percentages are based on total resin solids of the resin. Free radical polymerization of the monomer mixture begins when the temperature is elevated to a temperature sufficient to liberate free radicals at a rate that sustains the polymerization reaction. A typical temperature range is 30–90° C., depending upon the particular reactants chosen.

The polymer dispersions obtained typically comprise 20 to 60 weight percent solids and may be employed as coating compositions and applied to any substrate including metals, plastics glass, wood, cloth, leather, paper, foam and the like by any conventional method including brushing, dipping, flow coating, spraying and the like. Generally, a coating of the aqueous composition is dried and cured at temperatures ranging from ambient to 1 50° C. for times ranging from 24 hours to 30 minutes.

Examples 1–3 describe the synthesis of specific embodiments of polyhydroxy compounds in accordance with the present invention using a preferred monoepoxy compound (CARDURA E) and various polyacids. The polyhydroxy products are used to make urethane prepolymers in Examples 8, 10, 11, and 12.

EXAMPLE 1

Reaction Product of EMPOL 1008/CARDURA E.

One mole of EMPOL® 1008 dimer diacid from Henkel Corporation was mixed with two moles of CARDURA E (glycidyl ester of neodecanoic acid, from Shell Chemical Company in the presence of 1% (on total weight) of ethyl triphenyl phosphonium iodide. The reaction mixture was heated to 120° C. and held at this temperature until all the epoxy groups were reacted as measured by epoxy equivalent weight. The product had infinite epoxy equivalent weight, total solids of more than 98 weight percent, and weight average molecular weight of about 1,500 as measured gel permeation chromatography using polystyrene as standard.

EXAMPLE 2

Reaction Product of Adipic Acid/CARDURA E.

This product was prepared in the same way as in Example 1 except that EMPOL 1008 was replaced by adipic acid on an equal molar basis.

EXAMPLE 3

Reaction Product of Dodecanedioic Acid/CARDURA F.

This product was prepared in the same way as in Example 1 except that EMPOL 1008 was replaced by dodecanedioic acid on an equal molar basis.

Examples 4–6 describe the synthesis of specific embodiments of polyhydroxy compounds in accordance with the present invention using a preferred monoepoxy compound and various polyacids as in Examples 1–3, with the addition of acrylate or methacrylate monomers. The acrylic polyhydroxy products are intended for incorporation into the acrylic portion of urethane/acrylic polymers as described in Examples 10, 11, and 12. The acrylate polyhydroxy compound of Example 4 was also used in the urethane portion of a polyurethane/acrylic polymer in Example 9.

EXAMPLE 4

Reaction Product of Glycidyl Methacrylate/EMPOL 1008/CARDURA E.

One mole of EMPOL 1008, and 1 mole of CARDURA E were mixed into a reactor containing 0.5% of 2,6-tert.-butyl-p-cresol and 1% of ethyl tri phenyl phosphonium iodide, based on weight of solids. The reaction mixture was heated to 120C and held till epoxy equivalent weight was infinite. One mole of glycidyl methacrylate was then added to the reactor over 1 hour and the solution was held until all the glycidyl methacrylate was reacted as measured by gas chromatography. The product had solids of more than 98%, and weight average molecular weight of about 1,500.

EXAMPLE 5

Reaction Product of Glycidyl Methacrylate/Adipic Acid/CARDURA E.

This product was made in the same way as in Example 5 except that EMPOL 1008 was replaced by adipic acid on an equal molar basis.

EXAMPLE 6

Reaction Product of Glycidyl Methacrylate/Dodecanedioic Acid/CARDURA E.

This product was made in the same way as in Example 5 except EMPOL 1008 was replaced with dodecanedioic acid on an equal molar basis.

Examples 7–12 describe polymerization of urethane/acrylic polymers. Example 7 is a comparative example in which water resistance is attained by use of costly DDI Diisocyanate rather by the polyhydroxy compounds of the present invention. Examples 8 employs a polyhydroxy compound in the urethane portion of the polymer in accordance with the present invention. Example 9 employs an acrylic polyhydroxy compound Example 4) in the urethane portion. Examples 10–12 use various polyhydroxy compounds in the urethane as well as acrylic polyhydroxy compound in the acrylic portion. These urethane/acrylic polymers were formulated into coating compositions as described in Examples A-1 through G-2 and tested for performance.

EXAMPLE 7

Comparative—DDI Isocyanate

This Example shows the preparation of an aqueous urethane/acrylic polymer dispersion of the type disclosed in co-pending, commonly owned U.S. patent application Ser. No. 08/668,069 in which DDI Diisocyanate is incorporated into the polyurethane as follows:

| Feed | Ingredient | Parts by weight |
|---|---|---|
| 1. | Methylene dicyclohexyl diisocyanate[1] | 183.5 |
| 2. | DDI ® 1410 diisocyanate[2] | 106.5 |
| 3. | FORMREZ ® 66-56[3] | 295.0 |
| 4. | Dibutyltin dilaurate | 0.5 |
| 5. | Dimethylol propionic acid | 45.6 |
| 6. | Methyl ethyl ketone | 143.6 |
| 7. | Methyl methacrylate | 246.0 |
| 8. | Butyl acrylate | 188.7 |
| 9. | Dimethylethanol amine | 30.3 |
| 10. | Ethylene diamine | 21.3 |
| 11. | Deionized water | 1625.0 |
| 12. | Ferrous ammonium sulfate (1% aqueous solution) | 1.5 |
| 13. | Isoascorbic acid | 1.0 |
| 14. | Hydrogen peroxide (35% aqueous solution) | 1.5 |
| 15. | Deionized water | 87.5 |

[1]DESMODUR ® W from Bayer Corp., Pittsburgh, Pennsylvania.
[2]2-heptyl-3,4-bis(9-isocyanato nonyl)-1-pentyl-cyclohexane from Henkel Corporation.
[3]Poly(1,6-hexanediol adipate), molecular weight about 2000, from Witco Corporation.

Into a clean dry reactor equipped with heating, cooling, stirring and a nitrogen blanket were charged feeds 1 to 6. The reaction mixture was heated to 70° C. and held at this temperature for 2 hours. After this hold, feeds 7, 8, and 9 were added to the reaction product while cooling the reactor to 35° C. The prepolymer/monomer mixture was then transferred into another reactor containing feeds 10 and 11. The resulting dispersion was heated to 40° C., followed by the addition of feeds 12, 13, 14, and 15. The solution exothermed to about 60° C. The product thus formed had the following physical properties: total solids of about 35%, pH of about 8.1, viscosity of about 100 centipoise.

EXAMPLE 8

This Example shows the preparation of a polyurethane/acrylic polymer dispersion in accordance with the present invention using the reaction product of Example 1 in the urethane portion. The procedure was essentially the same as that in Example 7.

| Number | Ingredient | Parts by weight |
|---|---|---|
| 1. | Methylene dicyclohexyl diisocyanate | 255.0 |
| 2. | Product of Example 1 | 106.5 |
| 3. | FORMREZ 66-56 | 220.0 |
| 4. | Dibutyltin dilaurate | 0.5 |
| 5. | Dimethylol propionic acid | 45.6 |
| 6. | Methyl ethyl ketone | 143.6 |
| 7. | Methyl methacrylate | 241.2 |
| 8. | Butyl acrylate | 192.6 |
| 9. | Dimethyl ethanol amine | 30.3 |
| 10. | Ethylene diamine | 21.3 |
| 11. | Deionized water | 1625.0 |
| 12. | Ferrous ammonium sulfate (1% aqueous solution) | 1.5 |
| 13. | Isoascorbic acid | 1.0 |
| 14. | Hydrogen peroxide (35% aqueous solution) | 1.5 |
| 15. | Deionized water | 87.5 |

EXAMPLE 9

A polyurethane/acrylic polymer was prepared in the same manner as in Example 8, using the acrylic polyhydroxy compound of Example 4 in place of the product of Example 1.

EXAMPLE 10

A polyurethane/acrylic polymer was prepared in the same manner as in Example 8, using the reaction product of Examples 1 in the urethane. Additionally, 28 weight percent of the butyl acrylate was replaced by the product of Example 4.

EXAMPLE 11

A polyurethane/acrylic polymer was prepared using the same procedure as Example 10 except that products of Example 1 and 5 were replaced with the products of Example 3 and 6 (dodecanedioic acid containing), respectively.

EXAMPLE 13

A polyurethane/acrylic polymer was prepared using the same procedure as Example 10 except that products of Example 1 and 5 were replaced with the products of Example 2 and 5 (adipic acid containing), respectively.

Each of coatings A through G were formulated in two related formulations, a base coat (A-1 through G-1) and a respective pearl overcoat (A-2 through G-2) for performance testing.

COATING EXAMPLE A-1 (COMPARATIVE)

For comparison purposes, a pigmented base coat composition was made as follows, using a commercially available aqueous acrylic resin (RHOPLEX® WL-96) instead of the polyurethane/acrylic dispersion of the present invention.

| Ingredients | Parts by Weight |
|---|---|
| RHOPLEX ® WL-96[1] | 192.44 |
| BENTONE ® EW[2] (1.9% by wt. aqueous dispersion) | 25.44 |
| Butyl CELLOSOLVE ®[3] | 4.74 |
| Polypropylene glycol | 4.74 |
| Butyl benzylphthalate | 9.49 |

-continued

| Ingredients | Parts by Weight |
|---|---|
| NOPCO DSX ® 1550[5] (10% by wt. aqueous solution) | 13.98 |
| SURFYNOL ® 104DPM[6] | 2.20 |
| Waterborne acrylic black tint[7] | 7.60 |
| Waterborne acrylic blue tint[8] | 76.87 |

[1]Aqueous acrylic emulsion from Rohm and Haas Company, Philadelphia, Pennsylvania.
[2]Organo clay rheological additive from Rheox, Inc., Hightstown, New Jersey.
[3]Ethylene glycol monobutyl ether solvent from Union Carbide Chemicals and Plastics Company, Inc., Danbury, Connecticut.
[4]Molecular weight approximately 425, from Arco Chemicals.
[5]Urethane associative thickener from Henkel Corporation, Kankakee, Illinois.
[6]Surfactant from Air Products and Chemicals, Inc., Allentown, Pennsylvania.
[7]A dispersion of carbon black pigment in an aqueous acrylic vehicle.
[8]A dispersion of phthalo blue pigment in an aqueous acrylic vehicle.

The coating composition of Example A-1 was prepared by slowly adding each of the materials in sequence to a mixing vessel under moderate agitation with a paddle blade, with 5 minutes of mixing between additions.

COATING EXAMPLE A-2 (COMPARATIVE)

For comparison purposes, a pearlescent intermediate coating composition was made as follows, using a commercially available aqueous acrylic resin (RHOPLEX® WL-96) instead of the polyurethane/acrylic dispersion of the present invention.

| Ingredients | Parts by Weight |
|---|---|
| Deionized water | 85.47 |
| LAPONITE ™ RD[1] | 0.85 |
| Deionized water | 62.14 |
| BENTONE ® EW | 2.05 |
| RHOPLEX ® WL-96 | 208.16 |
| Butyl CELLOSOLVE ® | 7.52 |
| Butyl CARBITOL ®[2] | 2.51 |
| Butyl benzylphthalate | 10.32 |
| NOPCO DSX ® 1550 (10% by wt. aqueous solution) | 50.80 |
| Amino methyl propanol (50% by wt. aqueous solution) | 0.97 |
| SURFYNOL ® DF210[3] | 0.19 |
| Pearl tinting dispersion[4] | 81.27 |
| NATROSOL ® Plus Grade 330[5] (0.8% by wt. aqueous dispersion) | 25.44 |
| Deionized water | 76.28 |

[1]Sodium lithium magnesium silicate thickener from Southern Clay Products, Gonzales, Texas.
[2]Diethylene glycol monobutyl ether solvent from Union Carbide Chemicals and Plastics Company, Inc., Danbury, Connecticut.
[3]Defoamer from Air Products and Chemicals, Inc., Allentown, Pennsylvania.
[4]A solvent-borne slurry of pearlescent mica.
[5]Hydroxyethylcellulose from Aqualon Company, Wilmington, Delaware.

The coating composition of Example A-2 was prepared in the following manner. In a mixing vessel under high speed agitation with a Cowles blade, the LAPONITE RD was sifted into the water. After 20 minutes, the additional water was added, the BENTONE EW was sifted into the vessel, and the high speed agitation with the Cowles blade continued for an additional 20 minutes. Following this mixing, the Cowles blade was replaced with a paddle blade, and the remaining materials were added slowly in sequence under moderate agitation, with 5 minutes of mixing between additions.

COATING EXAMPLE B-1 (COMPARATIVE)

A pigmented base coat composition was made as follows, corresponding to Example A-1, but with the polyurethane/acrylic dispersion of Example 7 (with DDI Diisocyanate). This composition serves as a benchmark of good humidity resistance performance.

| Ingredients | Parts by Weight |
|---|---|
| Aqueous urethane/acrylic polymer dispersion of Example 7 | 228.68 |
| BENTONE ® EW (1.9% by wt. aqueous dispersion) | 25.44 |
| NOPCO DSX ® 1550 (10% by wt. aqueous solution) | 13.98 |
| SURFYNOL ® 104DPM | 2.20 |
| Waterborne acrylic black tint | 7.60 |
| Waterborne acrylic blue tint | 76.87 |
| Deionized water | 35.48 |

The Butyl Cellosolve, polypropylene glycol, and butylbenzylphthalate, which were necessary for proper film coalescence in Example A-1, were not necessary in this example due to differences between the acrylic emulsion and the urethane/acrylic dispersion. The coating composition of Example B-1 was prepared in the following manner. In a mixing vessel under moderate agitation with a paddle blade, the materials were added slowly in sequence, with 5 minutes of mixing between additions. The black and blue tints were the same as in Example A-1.

COATING EXAMPLE B-2 (COMPARATIVE)

A pearlescent intermediate coating composition was made as follows corresponding to Example B-1 using the polyurethane/acrylic dispersion of Example 7.

| Ingredients | Parts by Weight |
|---|---|
| Deionized water | 85.47 |
| LAPONITE ® RD | 0.85 |
| Deionized water | 62.14 |
| BENTONE ® EW | 2.05 |
| Aqueous urethane/acrylic polymer dispersion of Example 7 | 245.10 |
| NOPCO DSX ® 1550 (10% by wt. aqueous solution) | 50.80 |
| Amino methyl propanol (50% by wt. aqueous solution) | 0.97 |
| SURFYNOL ® DF210 | 0.19 |
| Pearl tinting dispersion | 81.27 |
| NATROSOL ® PLUS Grade 330 (0.8% by wt. aqueous dispersion) | 25.44 |
| Deionized water | 76.28 |

The butyl CELLOSOLVE, butyl CARBITOL, and butylbenzylphthalate, which were necessary for proper film coalescence in Example A-2, were not necessary in this example and those that follow due to differences between the acrylic emulsion and the urethane/acrylic dispersion. The coating composition of Example B-2 was prepared in the following manner. In a mixing vessel under high speed agitation with a Cowles blade, the LAPONITE RD was sifted into the water. After 20 minutes, the additional water was added, the BENTONE EW was sifted into the vessel, and the high speed agitation with the Cowles blade continued for an additional 20 minutes. Following this mixing, the Cowles blade was replaced with a paddle blade, and the remaining materials were added slowly in sequence under moderate agitation, with 5 minutes of mixing between additions.

COATING EXAMPLES C-1 AND C-2

Formulation C-1 was the same as Example B-1, except that the aqueous urethane/acrylic polymer dispersion of Example 7 was replaced by the aqueous urethane/acrylic polymer dispersion of Example 8 on a weight solids basis. Similarly, C-2 corresponded to B-2 with the polymer of Example 7 replaced by the polymer of Example 8.

COATING EXAMPLES D-1 AND D-2

These formulations were prepared in the same way as Examples B-1 and B-2 except that the aqueous urethane/acrylic polymer dispersion of Example 7 was replaced by the aqueous urethane/acrylic polymer dispersion of Example 9 on a weight solids basis.

COATING EXAMPLES E-1 AND E-2

These formulations were prepared in the same way as Examples B-1 and B-2 except that the aqueous urethane/acrylic polymer dispersion of Example 7 was replaced by the aqueous urethane/acrylic polymer dispersion of Example 10 on a weight solids basis.

COATING EXAMPLES F-1 AND F-2

These formulations were prepared in the same way as Examples B-1 and B-2 except that the aqueous urethane/acrylic polymer dispersion of Example 7 was replaced by the aqueous urethane/acrylic polymer dispersion of Example 11 on a weight solids basis.

COATING EXAMPLES G-1 AND G-2

These formulations were prepared in the same way as Example B-1 and B-2 except that the aqueous urethane/acrylic polymer dispersion of Example 7 was replaced by the aqueous urethane/acrylic polymer dispersion of Example 12 on a weight solids basis.

Each of the coating formulations of Examples A through G was tested for performance by application onto a substrate prepared as follows. The substrates were 32 gauge steel panels precoated with electrocoat and primer (available from Advanced Coating Technologies, Inc., Hillsdale, Mich.; as APR24711), scuffed with 400 grit sandpaper (P400-213Q, Imperial Wetordry production paper, "A" weight, available from 3M, St. Paul, Minn.), wiped clean with DX 330 degreaser (available from PPG Industries, Inc., Pittsburgh, Pa.), and sealed with DP 40/DP 401 /DT 870 (a sealer made by mixing 1 volume DP 40 epoxy primer with 1 volume DP 401 epoxy primer catalyst with ½ volume DT 870 reducer, all available from PPG Industries, Inc.). The sealed substrates were air-dried under ambient conditions for at least 1 hour before the example coatings were applied.

Each of the compositions of Examples A-1, B-1, C-1, D-1, E-1, F-1 and G-1 was applied by air-atomized spray at 53 pounds per square inch over the previously prepared substrates to achieve hiding. Each coated substrate was air-dried under ambient conditions for at least 20 minutes. Then each of the previously applied coatings of was coated with the corresponding composition of Example A-2, B-2, C-2, D-2, E-2, F-2, or G-2, respectively. Each of the compositions of Example A-2, B-2, C-2, D-2, E-2, F-2, and G-2 was applied by air-atomized spray at 53 pounds per square inch. Each coated substrate was then air-dried under ambient conditions for at least 20 minutes.

The base coat of Example D-1 was not recoated with the additional pearl coat D-2. This stage of the testing was eliminated for this example because it failed adhesion testing after humidity exposure with the base coat alone; thus, the more stringent multi-coat testing was not necessary.

Each double coated substrate of Examples A through C and E thorough G was then coated with DCU 2021/DCX 61/DT 870 (a clearcoat made by mixing 4 volumes DCU 2021 urethane clearcoat with 1 volume DCX 61 urethane hardener with 1 volume DT 870 reducer, all available from PPG Industries, Inc.).

Evaluation of adhesion, gloss, and DOI (distinctness of image) of the coated substrates as described above was performed following 168 hours of air-drying at ambient conditions, and was performed again following a subsequent exposure to either 96 hours at 100 degrees F and 100% relative humidity or 240 hours of immersion in water at 104° F. (40° C.). The adhesion, gloss, and DOI tests were performed no later than 5 minutes after removal of the panels from the humidity or water soak exposure. The results are set forth in Table I.

Adhesion testing was performed in accordance with the method set forth in ASTM D3359, Method B, whereby the coating was scribed with eleven parallel cuts through the film 2 millimeters apart, using a Gardner Cross Cut Tester Model P-A-T, fitted with a PA-2056 blade (both available from Gardco, Pompano Beach, Fla.). Eleven similar cuts were made at 90 degrees to and crossing the first eleven cuts. Permacel 99 tape was applied over the area of cuts by pressing down firmly against the coating to eliminate voids and air pockets. Then the tape was sharply pulled off at a 180 degree angle to the plane of the coated surface. Adhesion was reported as the percentage of squares remaining on the substrate in the scribed area. Thus, a result of 100% indicates no loss of adhesion, and 0% indicates total failure of adhesion.

Gloss measurements of each coated panel were made using a Gardner Glossgard IIa 20 degree glossmeter (available from Pacific Scientific, a Gardner/Neotec Instrument Division, Silver Spring, Md.). Results are in terms of percentage of light reflected, whereby a higher number indicates higher gloss.

DOI measurements of each coated panel were made using a DOI "C-box" (available from I$^2$R Company, Cheltenham, Pa.).

TABLE 1

| BASE COAT FORMULATIONS | | | | | |
|---|---|---|---|---|---|
| EXAMPLE | C-1 | D-1 | E-1 | F-1 | G-1 |
| ADHESION | | | | | |
| ambient | 100% | 100% | 100% | 100% | 100% |
| after humidity | 100% | 0% | 100% | 100% | 100% |
| after watersoak | 100% | 0% | 100% | 100% | 100% |
| GLOSS | | | | | |
| ambient | 87 | 84 | 89 | 87 | 87 |
| after humidity | 86 | 82 | 85 | 87 | 85 |
| after watersoak | 76 | 68 | 79 | 85 | 82 |
| DOI | | | | | |
| ambient | 70 | 50 | 80 | 90 | 80 |
| after humidity | 60 | 40 | 50 | 80 | 70 |
| after watersoak | 40 | 30 | 50 | 75 | 50 |

TABLE 2

| | BASECOAT + PEARL COAT + CLEAR | | | | | |
|---|---|---|---|---|---|---|
| EXAMPLE | A-1 + A-2 | B-1 + B-2 | C-1 + C-2 | E-1 + E-2 | F-1 + F-2 | G-1 + G-2 |
| ADHESION | | | | | | |
| ambient | 100% | 100% | 95–100% | 100% | 100% | 100% |
| after humidity | 0% | 100% | 95% | 100% | 100% | 100% |
| after watersoak | 0% | 100% | 65% | 100% | 100% | 100% |
| GLOSS | | | | | | |
| ambient | 90 | 91 | 90 | 90 | 89 | 90 |
| after humidity | 76 | 85 | 75 | 86 | 84 | 81 |
| after watersoak | 77 | 76 | 74 | 82 | 81 | 73 |
| DOI | | | | | | |
| ambient | 70 | 80 | 65 | 80 | 80 | 65 |
| after humidity | 30 | 60 | 40 | 65 | 45 | 50 |
| after watersoak | 20 | 45 | 30 | 60 | 30 | 30 |

EXAMPLES H AND J

These examples show the effect of the urethane-to-acrylic ratio to the performance of the coatings of the present invention. Base coats H-1 and J-1 and pearl coats H-2 and J-2 were all made with a waterborne polyurethane/acrylic polymer of the type described in Example 10 and formulated in essentially the same manner as Example E. However the urethane/acrylic weight ratio in the polymer used in H-1 and H-2 was 40%/60% whereas in J-1 and J-2 it was 60%/40% urethane/acrylic. As shown in Table 3, when the two polymers were compared as solid base coats only, results were similar. However, when solid plus pearl coat samples were compared, the 60/40 ratio was clearly superior.

TABLE 3

| EXAMPLE | H-1 | J-1 | H-1 + H-2 | J-1 + J-2 |
|---|---|---|---|---|
| ADHESION | 40/60 | 60/40 | 40/60 | 60/40 |
| ambient | 100% | 100% | 100% | 100% |
| after humidity | 100% | 100% | 0% | 35–64% |
| after watersoak | 100% | 100% | 0% | 85–94% |
| GLOSS | | | | |
| ambient | 88 | 88 | 88 | 88 |
| after humidity | 86 | 81 | 41 | 53 |
| after watersoak | 84 | 84 | 52 | 80 |
| DOI | | | | |
| ambient | 80 | 80 | 70 | 70 |
| after humidity | 70 | 60 | 0 | 0 |
| after watersoak | 70 | 60 | 0 | 30 |

Although certain embodiments of the invention have been described in detail for the purpose of illustrating the best mode of the invention, it is to be understood that such detail is solely for that purpose and that variations can be made by those skilled in the art without departing from the spirit and scope of the invention as defined by the claims.

What is claimed is:

1. A water reducible polyurethane resin which comprises the reaction product of:
   (i) a polyisocyanate;
   (ii) a polyhydroxy compound which is the reaction product of a polycarboxylic acid and an epoxy compound, at least one of which includes a hydrocarbon group of at least six carbon atoms; and
   (iii) a monomer having an anionic group and functionality reactive with isocyanate, said monomer being present in sufficient amount to provide aqueous dispersibility to the polyurethane resin;
   wherein polyisocyanate (i) is in excess so as to yield an isocyanate functional product.

2. The resin of claim 1 including 50–90 percent by weight of the polyurethane and 10–50 percent by weight of free radical polymerization product of a mixture of vinyl monomers, the weight percentages based on total resin solids of the resin.

3. The resin of claim 2 wherein the vinyl monomers include an acrylate functional compound which is the reaction product of a polyacid, an epoxy compound, and another epoxy compound which is an epoxy acrylate, at least one of which includes a hydrocarbon group of at least six carbon atoms.

4. The resin of claim 1 wherein the polycarboxylic acid used to make the polyhydroxy compound has the structure:

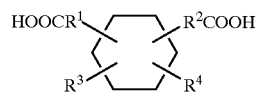

where $R^1$ and $R^2$ are the same or different, $R^1$ and $R^2$ each contain alkylene groups at least $C_6$ in length and $R^3$ and $R^4$ are the same or different and each are H or an alkyl group.

5. The resin of claim 4 wherein $R^1$ and $R^2$ each contain alkylene groups at least $C_8$ in length, and $R^3$ and $R^4$ each are an alkyl group.

6. The resin of claim 3 wherein the polyacid used to make the acrylate functional compound has the structure:

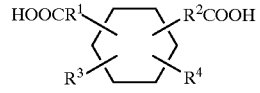

where $R^1$ and $R^2$ are the same or different, $R^1$ and $R^2$ each contain alkylene groups at least $C_6$ in length and $R^3$ and $R^4$ are the same or different and each are H or an alkyl group.

7. The resin of claim 6 wherein $R^1$ and $R^2$ each contain alkylene groups at least $C_8$ in length, and $R^3$ and $R^4$ each are an alkyl group.

8. The resin of claim 1 wherein the epoxy compound used to make the polyhydroxy compound contains a hydrocarbon group containing at least six carbon atoms.

9. The resin of claim 8 wherein the epoxy compound is the glycidyl ester of neodecanoic acid and propylene oxide.

10. The resin of claim 3 wherein the epoxy compound used to make the acrylate functional compound contains a hydrocarbon group containing at least six carbon atoms.

11. The resin of claim 10 wherein the epoxy compound used to make the acrylate functional compound is the glycidyl ester of neodecanoic acid and propylene oxide.

12. The resin of claim 1 wherein the polyurethane is the reaction product of:
   (i) 20–70 percent by weight of said polyisocyanate;
   (ii) 25–70 percent by weight of said polyhydroxy compound; and
   (iii) 1–10 percent by weight of said monomer having an anionic group and functionality reactive with isocyanate;
   the weight percentages based on total resin solids weight of the polyurethane reactants.

13. The resin of claim 1 wherein the polyurethane is the reaction product of:
   (i) 30–60 percent by weight of said polyisocyanate;
   (ii) 25–60 percent by weight of said polyhydroxy compound; and
   (iii) 5–10 percent by weight of said monomer having an anionic group and functionality reactive with isocyanate;
   the weight percentages based on total resin solids weight of the polyurethane reactants.

14. The resin of claim 1 which includes a polyol in addition to the polyhydroxy compound where the polyhydroxy compound is present in an amount in the monomer mixture from about 20 percent by weight and not more than 50 percent by weight of the isocyanate-reactive monomer content.

15. The resin of claim 14 wherein the polyhydroxy compound is present in an amount from at least 25 percent of the polyol mixture and the second polyol is a polymeric polyol having a molecular weight in the range of 200 to 6000 and selected from the group of polyols consisting of: polyester polyols, polyesteramide polyols, polyether polyols, polythioether polyols, polycarbonate polyols, polyacetal polyols, polyolefin polyols and polysiloxane polyols.

16. The resin of claim 14 wherein the polyhydroxy compound is the reaction product of $C_{36}$ dimer diacid and the propylene oxide ester of neodecanoic acid.

17. The resin of claim 1 which has a weight percent solids of 20 to 60.

18. A coating composition comprising:
   (a) a water reducible polyurethane resin comprising the reaction product of:
      (i) a polyisocyanate;
      (ii) a polyhydroxy compound which is the reaction product of a polycarboxylic acid and an epoxy compound, at least one of which includes a hydrocarbon group of at least six carbon atoms; and
      (iii) a monomer having an anionic group and functionality reactive with isocyanate.
   (b) an acrylic resin; and
   (c) pigment.

19. The resin of claim 18 wherein the acrylic resin is the reaction product of vinyl monomers including an acrylate functional compound which is the reaction product of a polyacid, an epoxy compound, and another epoxy compound which is an epoxy acrylate, at least one of which includes a hydrocarbon group of at least six carbon atoms.

20. A coating composition comprising:
   (a) 50–90 percent by weight, the weight percentages based on total resin solids of (a) plus (c), of a water reducible polyurethane resin comprising the reaction product of:
      (i) a polyisocyanate;
      (ii) a polyhydroxy compound which is the reaction product of a polycarboxylic acid and an epoxy compound, at least one of which includes a hydrocarbon group of at least six carbon atoms;
      (iii) a monomer having an anionic group and functionality reactive with isocyanate; and
      (iv) a polyol in addition to the polyhydroxy compound where the polyhydroxy compound is present in an amount in the monomer mixture from about 20 percent by weight and not more than 50 percent by weight of the isocyanate-reactive monomer content of (ii) and (iii) and (iv);
   wherein the polyisocyanate and the polyhydroxy compound and polyol components are suitably reacted in such proportions that the ratio of number of isocyanate groups to the number of isocyanate-reactive groups is in the range from about 1.1:1 to about 6:1;
      v) neutralizing agent in an amount to disperse the polyurethane as a prepolymer in water selected from the group consisting of ammonia; primary, secondary, or tertiary aliphatic, alicyclic, aromatic, araliphatic or heterocyclic amines; and amines with hydroxy substituted alkyl groups; and
   (b) an active hydrogen-containing compound to chain extend the urethane prepolymer selected from the group consisting of: polyol, amino alcohol, ammonia, and primary or a secondary aliphatic, alicyclic, aromatic, araliphatic or heterocyclic amine, in an amount to give a ratio of active hydrogens in the chain extender to isocyanate groups in the prepolymer in the range from 0.7 to 1.3:1;
   (c) 10–50 percent by weight of acrylic resin as the free radical polymerization product of a mixture of vinyl monomers, the weight percentages based on total resin solids of (a) plus (c); and
   (d) pigment.

* * * * *